United States Patent

[11] 3,540,487

| [72] | Inventor | Frank S. LoRusso<br>Rochester, New York |
|---|---|---|
| [21] | Appl. No. | 785,658 |
| [22] | Filed | Dec. 20, 1968 |
| [45] | Patented | Nov. 17, 1970 |
| [73] | Assignee | Eastman Kodak Company<br>Rochester, New York<br>a corporation of New Jersey |

[54] SPACER FOR PREINSULATED PIPE
2 Claims, 3 Drawing Figs.

[52] U.S. Cl. .................................................. 138/112
[51] Int. Cl. .................................................. F16l 9/18
[50] Field of Search........................................... 138/112,
113, 148, 166

[56] References Cited
UNITED STATES PATENTS
360,782 4/1887 Ober .............................. 138/112X

| 2,512,116 | 6/1950 | Siebels .......................... | 138/113 |
| 2,551,710 | 5/1951 | Slaughter ...................... | 138/113UX |
| 2,714,395 | 8/1955 | Epstein........................... | 138/113 |
| 3,296,688 | 1/1967 | Hervig............................ | 138/113X |

*Primary Examiner*—Louis K. Rimrodt
*Attorney*—Walter O. Hodsdon and Paul R. Holmes ABSTRACT: A spacer for concentrically supporting a shell around a pipe wherein the spacer is a flat flexible web having a plurality of spaced hollow projections extending from one surface thereof and having a locking orifice formed adjacent one end. The spacer is formed into a circular band around the outer periphery of a pipe and the orifice is locked over the projection positioned adjacent the opposite end. The shell is placed over the projections and is supported around the pipe by the spacer projections. The torus space is then filled with a solidifiable foam.

Patented Nov. 17, 1970

3,540,487

FRANK S. LoRUSSO
INVENTOR.

BY

ATTORNEYS

SPACER FOR PREINSULATED PIPE

BACKGROUND OF THE INVENTION

This invention relates to foam insulated pipes. More particularly, this invention relates to spacers for use in the manufacture of foam insulated pipes.

A popular technique of insulating a pipe is to space a shell or jacket around the pipe, cap the ends, and then fill the annular space between the pipe and shell with liquid foam or the components to generate the solidifiable foam. The foam is placed in the annular space by means of a conduit which extends through a hole in the shell or through a hole in one of the end caps. When the space is filled with foam, the foam is allowed to solidify and the pipe is permanently insulated.

One of the major problems in insulating a pipe by this method is to keep the pipe concentric with the shell. For most insulating applications the insulation should be of uniform thickness around the pipe for maximum effectiveness in maintaining the desired temperature inside the pipe. Therefore, in order to maintain the concentricity between the pipe and shell, spacing devices are used to support the shell around the pipe.

The ideal spacer must be of sufficient strength to support the shell around the pipe. It must also be designed such that the foam can flow freely between the shell and pipe to completely fill up the annular space therebetween. The ideal spacer must also be easy to install to save time and improve the efficiency of the manufacturing process.

The prior art has attempted to meet these criteria and to solve the many additional problems in a variety of ways. Some attempts have included placing collars over the outside of the pipe or fixing wooden or foam blocks to the outside of the pipe between the pipe and shell. Other spacers have included rings having radial arms which extend to support the shell around the pipe.

Many of the spacers offered by the prior art are somewhat inconvenient to use because of the special steps that have to be taken in their fabrication and use. Collars and blocks have to be specially formed to conform to the radius of a particular pipe size. In the case of blocks, they have to be glued or otherwise suitably attached to the outer periphery of the pipe surface. There is also the problem of properly securing the spacers so that the jacket or shell can be easily slipped over the spacers without detaching them from their designated position; this step adds time to the manufacturing process.

SUMMARY OF THE INVENTION

The present invention, although it uses some of the concepts established by the prior art, improves on the prior art with a spacer which can be quickly and efficiently applied to the outer periphery of a pipe for holding the pipe concentric with a hollow shell placed thereover. The spacer of the present invention is an elongated flexible web having a plurality of substantially equal length hollow projections extending from one surface thereof. Means are included for releasably connecting one end of the web to the other to form a circular band. When the web is formed into such a band around the outer periphery of the pipe the projections extend radially outward therefrom so that when a hollow cylindrical jacket is placed over the ends of the protrusions, it is held concentrically from the pipe.

A preferred embodiment of the present invention is a flexible plastic web having a plurality of hollow, wedge-shaped protrusions formed therein, and extending from one side thereof. When the web is formed into a circular band around the outer periphery of a pipe, the wedge-shaped protrusions extend radially outward therefrom so that a hollow jacket can be supported concentrically around the pipe on the pointed edges of the wedges.

In this embodiment of the present invention a locking orifice is positioned at one end of the web. When the web is formed into a circular band around a pipe the locking orifice engages the outer periphery of the lug at the opposite end of the web to lock the web in a stable position around the pipe.

In a further aspect of the preferred embodiment of the present invention, a locking orifice having a locking edge is positioned in one end of the web. In this aspect, the wedge-shaped protrusion at the opposite end of the web has a leading and a trailing ramp. The portion of the trailing ramp adjacent the web is in a plane which is substantially perpendicular to the plane of the web. When the web is wrapped around the outer periphery of a pipe, the locking orifice engages the outer periphery of the protrusion at the opposite end of the web such that the locking edge of the locking orifice engages that portion of the trailing ramp adjacent the web whereby the spacer is held securely in place on the pipe.

The various features of novelty which characterize the invention are pointed out with particularity in the claims annexed to and forming a part of the specification. For a better understanding of the invention, the operating advantages and the objectives obtained by its use, reference should be had to the accompanying drawings and descriptive matter in which a preferred embodiment of the invention has been illustrated.

DESCRIPTION OF THE PREFERRED EMBODIMENT

Figure 1:
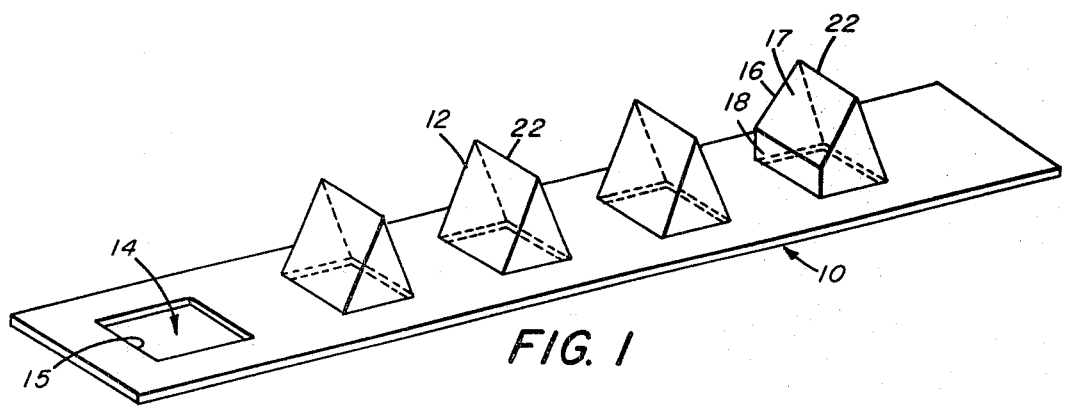
FIG. 1 shows a perspective view of the preferred embodiment of the present invention.

The spacer of the present invention is, as shown in FIG. 1, an elongated web 10 having a plurality of hollow wedge-shaped projections or lugs 12 disposed along one surface.

Figure 2:
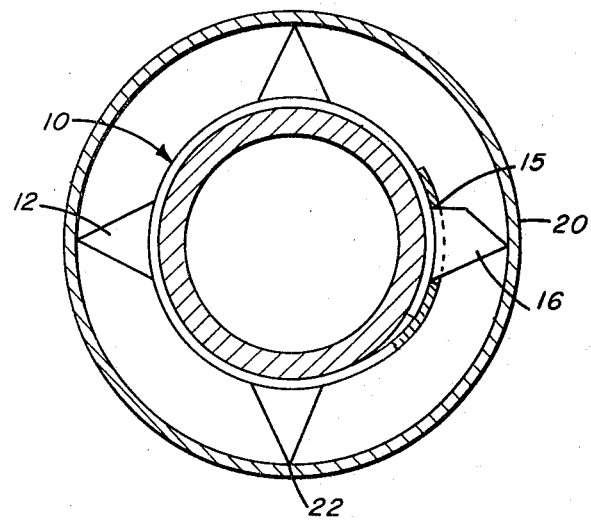
FIG. 2 shows a cross-sectional view of the preferred embodiment formed into a circular band.
Figure 3:
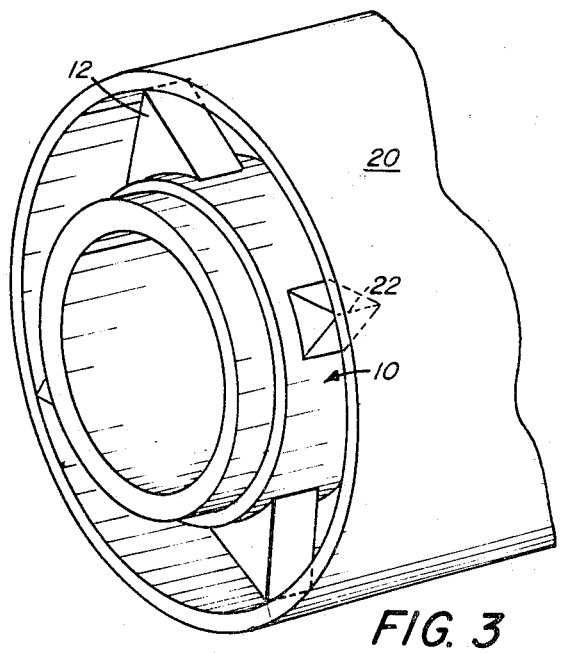
FIG. 3 shows a perspective view of a spacer engaging the outer periphery of a pipe as shown in FIG. 2 but rotated 180°.

A locking orifice 14 is formed adjacent one end of the web or strap 10 and the lug at the opposite end of the web is designated the locking lug 16. When the spacer is wrapped around a pipe as shown in FIG. 2, the locking orifice 14 engages the outer periphery of the locking lug 16 to hold the spacer firmly in place in the pipe. The lugs 12 are preferably equally spaced to support the shell 20 that is positioned over the edge 22 as shown in FIGS. 2 and 3. However, the present invention can be practiced with any number of lugs so long as sufficient space between the lugs is provided to permit flow of the liquid foam around the pipe. FIG. 3 shows one spacer fitted around a pipe. In actual practice several spacers are used to support the shell depending upon the length of the pipe and shell.

The spacer can be formed by a number of suitable well-known techniques. For instance, a flat plastic web of polyethylene, high impact polystyrene, or any similar suitable thermoplastic material, ranging in thickness from about .06 inch to about .125 inch can be placed in a vacuum mold having cavities conforming to the outside dimensions of the wedges. When the appropriate heat and vacuum are applied, the wedges or lugs are formed from the web in the mold cavities. The spacer thereby formed is one continuous uniform body. The locking orifice can be punched or cut in the web after the lugs have been molded.

The wedges formed are of course hollow and there are no base panels beneath the wedges so that the overall appearance is that of hollow baseless wedges positioned over orifices in the web, as shown in FIG. 1. The fact that the wedges are hollow is an advantage of the present invention because when the spacer is wrapped around a pipe the air space inside the wedge is dead air that will not readily conduct heat to or from the pipe.

It is well within the scope of the present invention to fabricate long lengths of webbing having a plurality of projections disposed therefrom and possibly also having intermittent portions wherein no projections have been formed. In this manner the spacer strap could be manufactured in relatively bulk form. When a spacer was needed the appropriate length could be cut and a locking orifice of suitable dimensions cut in one end.

It must be understood of course that a given lug or wedge height will preferably be used for a small range of pipe sizes. This is because the insulation thickness needed to maintain a certain temperature varies with the pipe diameter.

The present invention can be appreciated in the large scale production of pipe having foam insulation, such as polyurethane foam or other similar foams that can be conveyed in a liquid state. Because of the ease of manufacture of the spacer it can greatly aid in the efficient manufacture of insulated pipe. The straps can be quickly and easily put in place over the pipe in the appropriate positions so that the shell can be positioned thereover. No special adhesives, clamps or other devices are needed to hold the spacer in place. The operator merely wraps it around the outer periphery of the pipe and engages the locking orifice over the end lug.

A special feature and advantage of the present invention is realized when as shown in FIG. 1 the locking lug 16 is shaped so that the trailing ramp 17 has a locking portion 18 that is in a plane substantially perpendicular to the plane defined by the web 10 when the web is flat. When the spacer is wrapped around a pipe as shown in FIG. 2, the locking orifice 14 is fitted around the outer periphery of the locking lug 16, and the locking edge 15 engages the locking portion 18 of the trailing ramp 16. Because of the attitude of the plane of the locking portion, the tangential pull of the locking edge against the locking portion 18 insures the secure engagement of the spacer strap around the pipe so that it will not slip during fabrication of the insulated pipe.

The invention has been described in detail with particular reference to preferred embodiments thereof, but it will be understood that variations and modifications can be effected within the spirit and scope of the invention.

I claim:
1. A spacer for concentrically spacing a pipe from a shell positioned therearound, said spacer comprising:
   an elongated flexible web having a locking orifice positioned adjacent one end thereof;
   a plurality of substantially equally spaced, and equisized, hollow wedge shaped lugs extending from one surface of said web; the respective bases of the said lugs being adapted to reside adjacent to said pipe, and the respective apices of said lugs being adapted to contact the interior of the said shell;
   said locking orifice being adapted for peripheral engagement with the base portion of the spacer lug nearest the opposite end of said web; and
   said orifice being sized and shaped like, but being slightly larger than, the base of a lug.
2. The invention according to claim 1 wherein said spacer lug nearest the opposite end of said web has a trailing ramp, said ramp having a locking portion adjacent said web which is substantially perpendicular to said web when said web is flat; and wherein said locking orifice has a locking edge for engaging said locking portion to releasably connect said one end to said opposite end.